United States Patent
Schoonmaker et al.

(10) Patent No.: US 11,554,759 B2
(45) Date of Patent: Jan. 17, 2023

(54) LAWN CARE VEHICLE BRAKE SYSTEM WITH INTUITIVE CONTROL

(71) Applicant: Husqvarna AB, Huskvarna (SE)

(72) Inventors: Adam Schoonmaker, Monroe, NC (US); Christopher Van Buren, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/614,018

(22) PCT Filed: Oct. 30, 2019

(86) PCT No.: PCT/IB2019/059311
§ 371 (c)(1),
(2) Date: Nov. 24, 2021

(87) PCT Pub. No.: WO2021/069964
PCT Pub. Date: Apr. 15, 2021

(65) Prior Publication Data
US 2022/0250592 A1     Aug. 11, 2022

Related U.S. Application Data

(60) Provisional application No. 62/913,939, filed on Oct. 11, 2019.

(51) Int. Cl.
*B60T 7/10* (2006.01)
*A01D 34/64* (2006.01)
(Continued)

(52) U.S. Cl.
CPC .............. *B60T 7/102* (2013.01); *A01D 34/64* (2013.01); *B60T 1/005* (2013.01); *B60T 11/04* (2013.01); *B62D 11/006* (2013.01); *B62D 11/04* (2013.01)

(58) Field of Classification Search
CPC .......... B60T 7/102; B60T 1/005; B60T 11/04; B62D 11/006; B62D 11/04; A01D 34/64
See application file for complete search history.

(56) References Cited

U.S. PATENT DOCUMENTS 6,056,074 A    5/2000   Heal et al.
6,301,864 B1 * 10/2001  Damie ............... A01D 34/6812
                                                    56/11.3
(Continued)

FOREIGN PATENT DOCUMENTS

| EP | 1867227 B1 | 10/2009 |
| WO | 2015169381 A1 | 11/2015 |
| WO | 2018211436 A1 | 11/2018 |

OTHER PUBLICATIONS

International Search Report and Written Opinion from related International Application No. PCT/IB2019/059311 dated Apr. 15, 2021, all pages cited in its entirety.

*Primary Examiner* — Tony H Winner
(74) *Attorney, Agent, or Firm* — Burr & Forman LLP

(57) ABSTRACT

A riding lawn care vehicle (10) may include a frame (60), a steering assembly (30), a brake assembly (110), and a mechanical brake linkage assembly (120). At least a first drive wheel (32) and a second drive wheel (32) of the riding lawn care vehicle (10) may be attachable to the frame (60). The steering assembly (30) may include a first steering lever (34) and a second steering lever (34), where the first and second steering levers (34) are operably coupled to the first and second drive wheels (32) respectively to facilitate turning of the riding lawn care vehicle (10) based on drive speed control of the first and second drive wheels (32) responsive to positioning of the first and second steering levers (34) along a first direction when the first and second steering levers are in an operating position. The brake assembly may be operably coupled to the first and second
(Continued)

drive wheels (32) to enable brakes to be selectively applied to the first and second drive wheels (32). The mechanical brake linkage assembly (120) may be configured to activate the brake assembly (110) relative to the first and second drive wheels (32) in response to movement of the first and second steering levers (34) in a direction parallel to the first direction after the first and second steering levers (34) have been moved from the operating position to a non-operating position.

23 Claims, 7 Drawing Sheets

(51) Int. Cl.
*B60T 1/00* (2006.01)
*B60T 11/04* (2006.01)
*B62D 11/00* (2006.01)
*B62D 11/04* (2006.01)

(56) References Cited

U.S. PATENT DOCUMENTS

| | | |
|---|---|---|
| 6,343,668 B1 | 2/2002 | Dean |
| 6,434,917 B1 * | 8/2002 | Bartel ................ A01D 34/64 |
| | | 56/14.7 |
| 7,686,108 B2 * | 3/2010 | Piontek ................ A01D 69/10 |
| | | 180/6.48 |
| 2003/0172857 A1 * | 9/2003 | Suzuki ................ F23G 5/24 |
| | | 110/252 |
| 2006/0172857 A1 * | 8/2006 | Eavenson ............ B62D 11/006 |
| | | 477/203 |
| 2006/0174601 A1 | 8/2006 | Piontek |
| 2006/0229770 A1 | 10/2006 | Strong |
| 2019/0274251 A1 * | 9/2019 | Dunbar ................ B60T 11/046 |

* cited by examiner

LAWN CARE VEHICLE BRAKE SYSTEM WITH INTUITIVE CONTROL

CROSS REFERENCE TO RELATED APPLICATION

This application claims priority to U.S. application No. 62/913,939 filed Oct. 11, 2019, the entire contents of which are hereby incorporated by reference in its entirety.

TECHNICAL FIELD

Example embodiments generally relate to lawn care vehicles and, more particularly, to brake systems (e.g., parking brake systems) for riding lawn care vehicles where the brake system provides and intuitive control paradigm.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some mowers have been provided with very short (e.g., near zero) turning radiuses. Such mowers have employed separate steering levers that interface with the drive wheels on each respective side of the mower.

When these separate steering levers are employed, it is common for a drive wheel on each side of the vehicle to be controlled by a corresponding lever on the same side of the vehicle. The drive wheel is then driven forward or backward based on whether the corresponding steering lever is also pushed forward or pulled backward toward the operator. Meanwhile, a common way of setting the parking brake for these short turning radius riding lawn care vehicles has been to set the brake by moving the steering levers to the outboard position. Thus, the steering levers generally are restricted to forward and rearward movement whenever the steering levers are in the inboard position (i.e., not in the outboard position), and the steering levers are generally immovable in the forward and rearward directions when the steering levers are in the outboard position.

BRIEF SUMMARY OF SOME EXAMPLES

Some example embodiments of the present invention provide steering levers on a riding lawn care vehicle that are movable forward or rearward while the steering levers are in the outboard position in order to activate a brake assembly. This arrangement, as will be discussed in greater detail below, tends to provide a more intuitive and improved operator experience during employment of the riding lawn care vehicle.

In one example embodiment, a riding lawn care vehicle is provided. The riding lawn care vehicle may include a frame, a steering assembly, a brake assembly, and a mechanical brake linkage assembly. At least a first drive wheel and a second drive wheel of the riding lawn care vehicle may be attachable to the frame. The steering assembly may include a first steering lever and a second steering lever, where the first and second steering levers are operably coupled to the first and second drive wheels respectively to facilitate turning of the riding lawn care vehicle based on drive speed control of the first and second drive wheels responsive to positioning of the first and second steering levers along a first direction when the first and second steering levers are in an operating position. The brake assembly may be operably coupled to the first and second drive wheels to enable brakes to be selectively applied to the first and second drive wheels. The mechanical brake linkage assembly may be configured to activate the brake assembly relative to the first and second drive wheels in response to movement of the first and second steering levers in a direction parallel to the first direction after the first and second steering levers have been moved from the operating position to a non-operating position.

In another example embodiment, a mechanical brake linkage assembly of a riding lawn care vehicle is provided. The riding lawn care vehicle may further include first and second drive wheels, first and second steering levers, and a brake assembly. The brake assembly may be operably coupled to the first and second drive wheels to enable brakes to be selectively applied to the first and second drive wheels. The first steering lever may be operably coupled to the first drive wheel and the second steering lever may be operably coupled to the second drive wheel. The riding lawn care vehicle may be steerable via the first and second steering levers to facilitate turning of the riding lawn care vehicle based on drive speed control of the first and second drive wheels responsive to positioning of the first and second steering levers along a first direction while the first and second steering levers are in an operating position. The mechanical brake linkage assembly may be configured to activate the brake assembly relative to the first and second drive wheels in response to movement of the first and second steering levers in a direction parallel to the first direction after the first and second steering levers have been moved from the operating position to a non-operating position.

In another example embodiment, a guide member for a riding lawn care vehicle is provided. The riding lawn care vehicle may include first and second drive wheels, first and second steering levers, a mechanical brake linkage assembly and a brake assembly. The brake assembly may be operably coupled to the first and second drive wheels to enable brakes to be selectively applied to the first and second drive wheels. The first steering lever may be operably coupled to the first drive wheel and the second steering lever is operably coupled to the second drive wheel. The riding lawn care vehicle may be steerable via the first and second steering levers to facilitate turning of the riding lawn care vehicle based on drive speed control of the first and second drive wheels responsive to positioning of the first and second steering levers along a first direction while the first and second steering levers are in an operating position. The mechanical brake linkage assembly is configured to activate the brake assembly relative to the first and second drive wheels in response to movement of the first and second steering levers in a direction parallel to the first direction after the first and second steering levers have been moved from the operating position to a non-operating position. The guide member may include a top plate defining a first slot, a second slot and a third slot to restrict movement of the first and second steering levers.

Some example embodiments may improve an operator's ability to apply the brakes of a lawn care vehicle for starting, dismounting, and/or transporting the vehicle. The user experience associated with operating and transporting the riding lawn care vehicle may therefore be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Figure 1A:
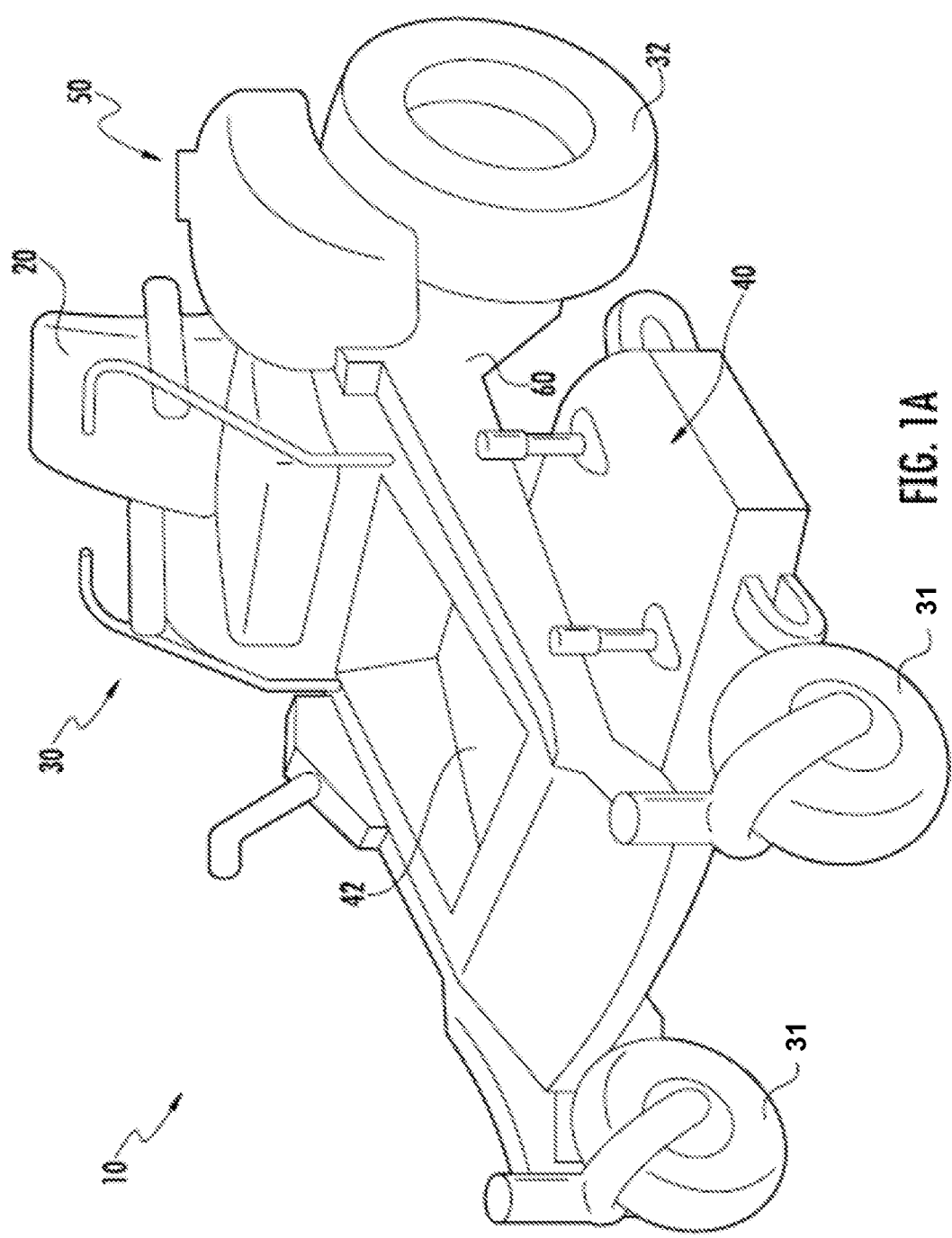
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to apply, engage, actuate, and/or otherwise activate brakes of lawn care vehicles such as, for example, riding lawn mowers. In this regard, some example embodiments may provide a steering assembly and guide member for use on a lawn care vehicle to facilitate applying brakes to the drive wheels by moving the steering levers in a direction other than the typical outboard direction. In particular, example embodiments may provide for the application of brakes in response to a rearward movement (although forward movement is also possible) of the steering levers while the steering levers are in the outboard position. The brakes may therefore be easily applied to facilitate dismounting, transporting, and/or starting of the vehicle while applying, for example, the parking brake. Moreover, the described structure creates a more intuitive operator experience than the current typical way of applying the brakes by simply moving the steering levers outboard.

In this regard, as noted above, the brakes are normally applied by moving the steering levers outboard (i.e., to the outboard position) from the inboard position. Moreover, the position of the steering levers in the outboard position is generally fixed (from a forward/rearward perspective) so that only movement back to the inboard position is possible. Thus, forward/rearward movement of the steering levers is normally only permitted while the steering levers are in the inboard position. However, as machines age, the pivot joints associated with applying the brakes in this fashion may become dirty, corroded or otherwise operate less cleanly. This may make it more difficult to move the steering levers all the way to the point of engaging the brakes and could create ambiguity as to whether the point of engaging has actually been reached.

Meanwhile, after the operator moves the steering levers to the outboard position, the steering levers generally spread apart to clear a path for the operator to dismount the vehicle by first standing up. In fact, many operators will tend to pull rearward on the steering levers while they are in the outboard position to facilitate standing prior to dismounting. Instead of having the movement of the steering levers to the outboard position providing the application of the parking brake, the intuitive movement of the steering levers rearward (while in the outboard position) may be used. This can create a situation where the rearward motion of the steering levers while in the outboard position can instead be used to set the parking brake. Allowing rearward motion (or forward motion) to be used to set the parking brake while already in the outboard position can ensure that there is no ambiguity about whether or not the parking brake is set. Moreover, if rearward motion is used (e.g., instead of forward motion, which is also possible), the rearward motion could also be an intuitive part of dismounting the riding lawn care vehicle.

Figure 1B:
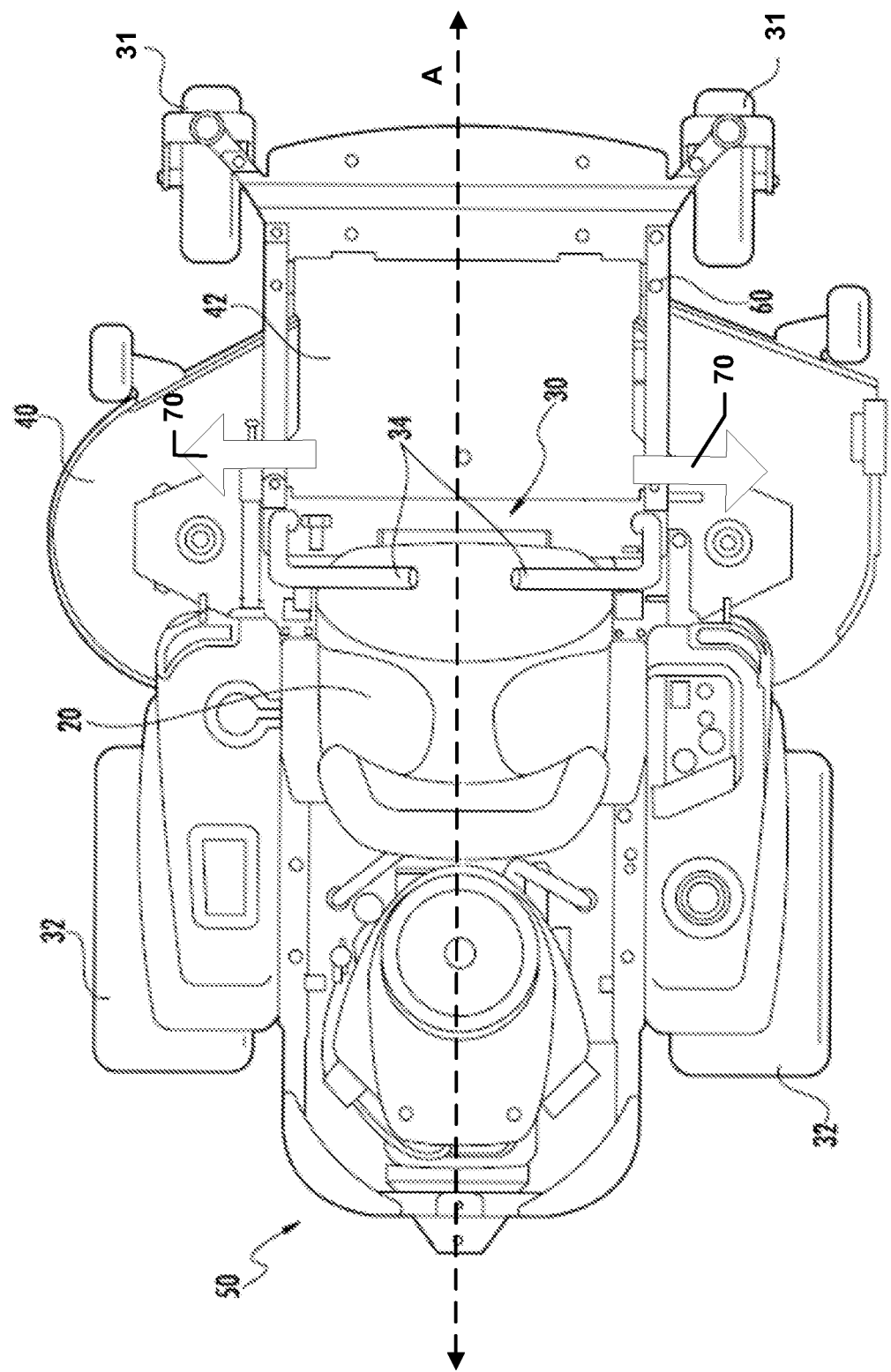
FIG. 1B illustrates a top view of the riding lawn care vehicle according to an example embodiment.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10.

Figure 2:
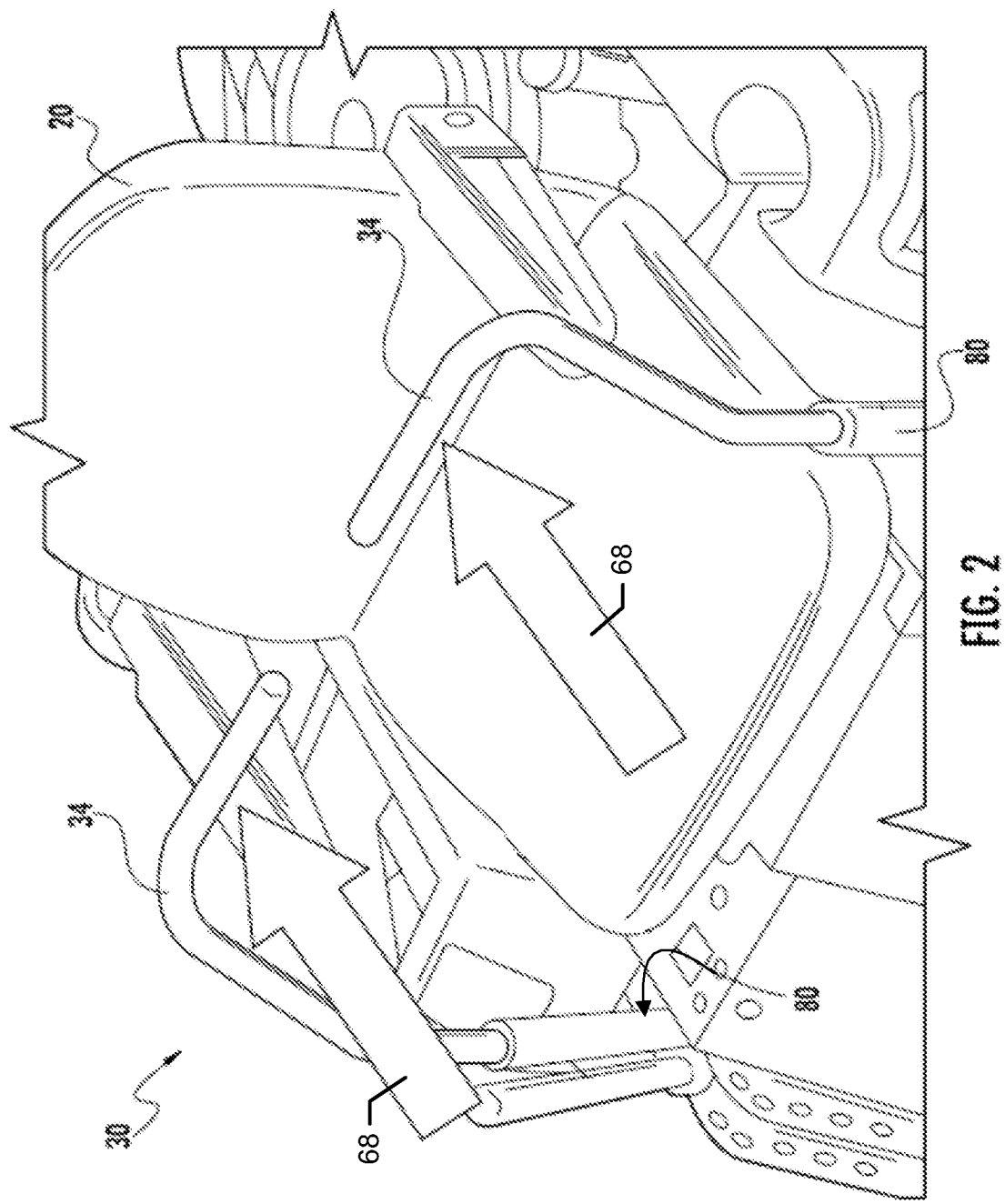
FIG. 2 illustrates a perspective view of a steering assembly with steering levers positioned to be pulled back for rearward propulsion according to an example embodiment.

FIG. 2 illustrates a perspective view of a steering assembly with steering levers positioned to be pulled back for rearward propulsion according to an example embodiment. Referring to FIGS. 1 and 2, the operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30. In an example embodiment, the steering assembly 30 may include separately operable steering levers 34 shown specifically in FIG. 1B and FIG. 2.

The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 31 and/or 32 to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. The steering levers 34 may be operable to move forward (i.e., in a direction opposite arrow 68 in FIG. 2) and rearward (i.e., in the direction shown by arrow 68 in FIG. 2) while in the inboard position (shown in both FIGS. 1 and 2).

When a steering lever 34 is pushed forward (e.g., away from the operator an opposite the direction of arrow 68), the corresponding hydraulic motor may drive the corresponding wheel forward. When a steering lever 34 is pulled rearward (e.g., toward the operator as shown by the direction of arrows 68 in FIG. 2), the corresponding hydraulic motor may drive the corresponding wheel backward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled back the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Although the steering levers 34 are generally moved forward (i.e., opposite the direction of the arrows 68 shown in FIG. 2) or backward (i.e., in the direction of the arrows 68 shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIG. 1B. In this regard, although the steering levers 34 are shown in the inboard (or operational) position in FIGS. 1 and 2, the steering levers 34 may be moved in the direction of arrows 70 (i.e., outboard) relative to their inboard position and into a non-operational position. In some cases, each of the steering levers 34 may be operably coupled to respective lever mounts 80 that may pivot to enable the steering levers 34 to move outwardly (e.g., to the outboard position) or inwardly (e.g., to an inboard and/or operating position). In some embodiments, when at least one (and sometimes both) of the steering levers 34 is pivoted outwardly, brakes may be applied and the operator may easily mount or dismount the riding lawn care vehicle 10 and sit in or leave the seat 20.

In some conventional riding lawn care vehicles, a brake lever separate and distinct from the steering assembly is provided to interface with the brake assembly of the vehicle. In others, as noted above, the steering levers 34 are moved outwardly to the outboard position, and the outward movement to the outboard position is used to operate a let of linkages or other operable coupling to set the brake assembly. In contrast, example embodiments of the present invention may provide for the setting of the brake assembly via one or both of the steering levers 34 of the steering assembly 30 being moved in a direction substantially perpendicular to the direction of outward movement (i.e., substantially perpendicular to the outboard direction, and substantially parallel to the direction of movement of the steering levers 34 during normal operation in the inboard position). For example, in some embodiments, the moving of one or both of the steering levers 34 to the outboard position will not cause the brakes to be set for the drive wheels (e.g., the rear wheels 32). Instead, movement to the outboard position will enable yet a further perpendicular movement either forward or rearward to set the brakes for the drive wheels. Thus, rather than having to operate a separate brake lever or worry about whether you have moved the steering levers 34 far enough outwardly to activate the brakes, example embodiments may activate the brake assembly (e.g., the brakes for the drive wheels) by unambiguously moving the steering levers 34 rearwardly (in one example) after the steering levers 34 have already been moved to the outboard position. Instead of a single (outward) motion, which can lead to ambiguity as to position (and potentially damaging the steering levers 34 by over applying torque due to the ambiguity and bending them), example embodiments may enable a second and intuitive locking motion (i.e., corresponding to the action of standing up if rearward movement is used) to be employed to the steering levers 34. Of note, some example embodiments may require both steering levers 34 to independently be moved to apply the parking brake to respective rear wheels 32. However, it may also be possible to have both brakes be operated by a single lever.

Figure 3:
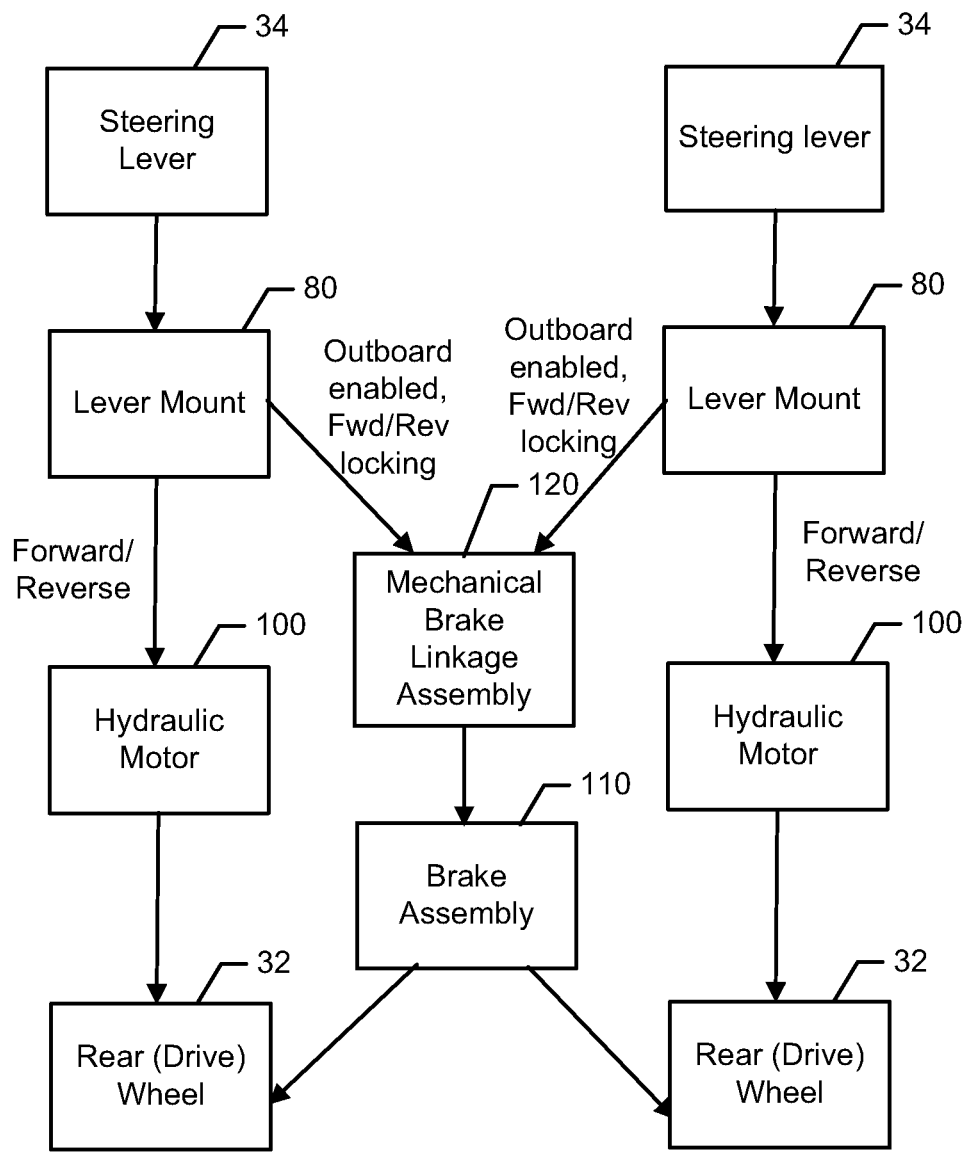
FIG. 3 illustrates a block diagram of some steering and braking components according to an example embodiment.

FIG. 3 illustrates a block diagram of some steering and braking components of an example embodiment. As shown in FIG. 3, each one of the steering levers 34 may be operably coupled to a corresponding one of the lever mounts 80. The lever mounts 80 may be operably coupled to corresponding hydraulic motors 100 that power respective ones of the drive wheels (e.g., the rear wheels 32). A brake system including a brake assembly 110 is also provided. However, as mentioned above, unlike a traditional system in which the brake assembly 110 is activated via outboard enabled, forward or rearward movement of the steering levers 34. To accomplish this, a mechanical brake linkage assembly 120 may be provided to operably coupled each respective steering lever 34 and/or lever mount 80 to the brake assembly 110 to activate brakes (electrically or mechanically) on the rear wheels 32 based on moving a position of the steering lever 34 and/or lever mount 80 to the outboard position, and then in one of either the forward direction or the rearward direction. Because the forward or rearward directional movement that applies the brake assembly 110 is only possible when the steering levers 34 have been moved outboard (i.e., to the outboard position) first, the forward or rearward directional movement for application of the brakes can be referred to as being "outboard enabled," which is to say that such movement (forward or rearward) is only enabled when the steering levers 34 are already in the outboard position before such movement is applied. Thus, while moving the lever mount 80 and corresponding steering lever 34 of either side in forward and reverse directions while in the inboard position correspondingly operates the hydraulic motor 100 and drive wheel of the respective side, the movement of the lever mounts 80 and corresponding steering lever 34 to the outboard position (e.g., moving the steering lever 34 outwardly and/or laterally away from the longitudinal centerline A (see FIG. 1B) of the riding lawn care vehicle 10) will enable the operator to engage and/or otherwise activate the brake assembly 110 by an additional movement of the corresponding lever mount 80 and steering lever 34 in a rearward (or forward) direction after being "outboard enabled."

As shown in FIG. 3, the mechanical brake linkage assembly 120 is provided to operably couple the lever mounts 80 to the brake assembly 110. In some cases, the mechanical brake linkage assembly 120 can be split into right side and left side linkages that are independent of each other. However, in other cases, the right and left side linkages may also be tied together so that they operate in tandem, or movement of one steering lever 34 carries the other. In either case, if the lever mount 80 on either side is pivoted to the outboard position, the mechanical brake linkage assembly 120 does not operate to activate the brake assembly 110 so that brakes are applied at the rear wheels 32 until a further movement (in a direction substantially perpendicular to the outward direction) is provided to apply the brakes.

Figure 4:
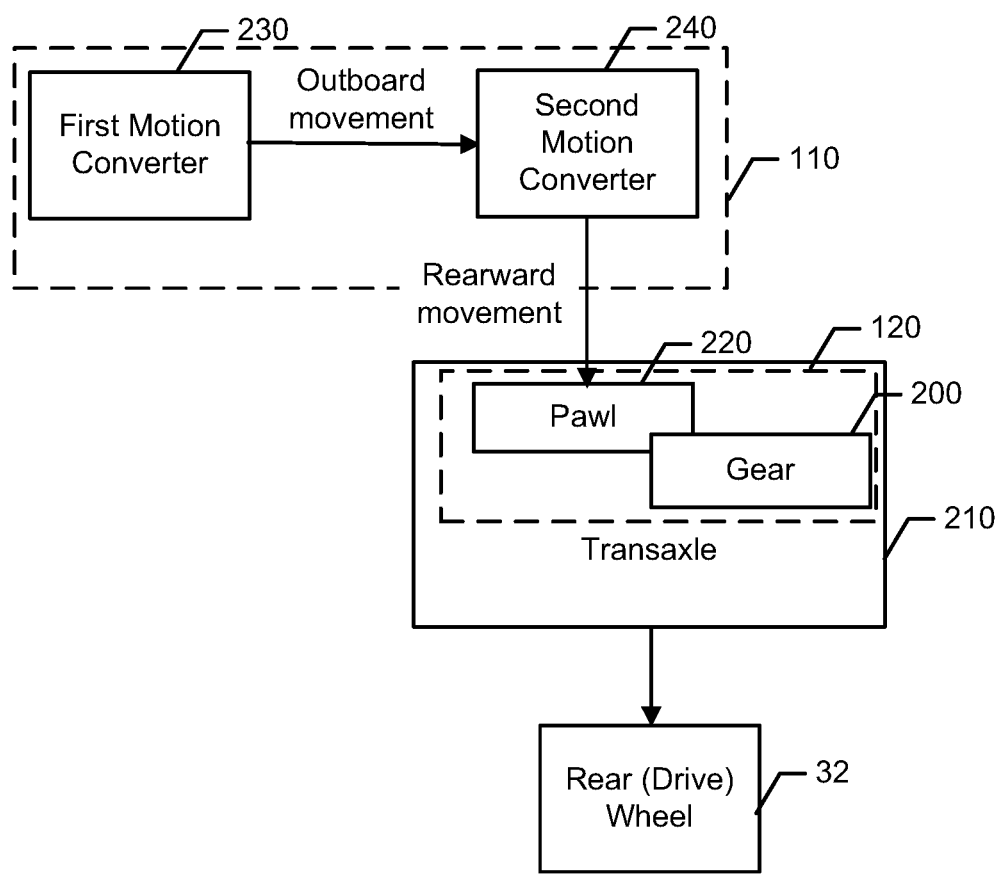
FIG. 4 illustrates a block diagram of a brake assembly and brake linkage assembly in accordance with an example embodiment.

FIG. 4 illustrates a block diagram of the brake assembly 110 and brake linkage assembly 120 of an example embodiment in greater detail. In this regard, the brake assembly 110 may include a gear 200 capable of locking a transaxle 210 of each respective rear wheel 32. The brake assembly 110 may further include a corresponding ratchet pawl 220 that may be engaged with the gear 200 by operation of the mechanical brake linkage assembly 120. If either one of the lever mounts 80 and corresponding steering levers 34 is moved to the outboard position, and then moved rearward (or forward if the design is modified to accept forward movement while in the outboard position), the corresponding one of the rear wheels 32 will be locked via operation of the mechanical brake linkage assembly 120 to activate the brake assembly 110 by causing the gears 200 to be engaged with their respective ratchet pawls 220 using the structure described above.

Meanwhile, the brake linkage assembly 120 may include a first motion converter 230 and a second motion converter 240. The first and second motion converters 230 may include cams, rods, linkages, pivot assemblies and/or the like. In an example embodiment, the first motion converter 230 may be configured to engage the second motion converter 240 responsive to movement of a respective one of the lever mounts 80 (or steering levers 34) being pivoted to the outboard position. After the first motion converter 230 has engaged or enabled the second motion converter 240 (i.e., by the steering lever 34 being positioned outboard), the second motion converter 240 may be configured to engage the brake assembly 110 (e.g., by movement of the ratchet pawl 220) responsive to movement of the corresponding lever mount 80 or steering lever 34 in the direction of arrow 68 (i.e., rearward in this example). This may lock the transaxle 210 as described above.

As noted above, it should be appreciated that the brake assembly 110 could be activated electrically or mechanically. Thus, in some cases, the brake linkage assembly 120 could be replaced by or embodied as a switch or switching component that can provide an electrical signal responsive to the outboard enabled, forward or rearward movement described herein. In such an example, the brake assembly 110 may be an electric parking brake, and the switch or switching component could be used to activate the brake assembly 110. Thus, for example, in embodiments where electric parking brakes are employed, the brake linkage assembly 120 (or switch assembly) may be configured to activate the electric parking brake responsive to movement of the steering levers 34 in the manner described herein.

Figure 5:
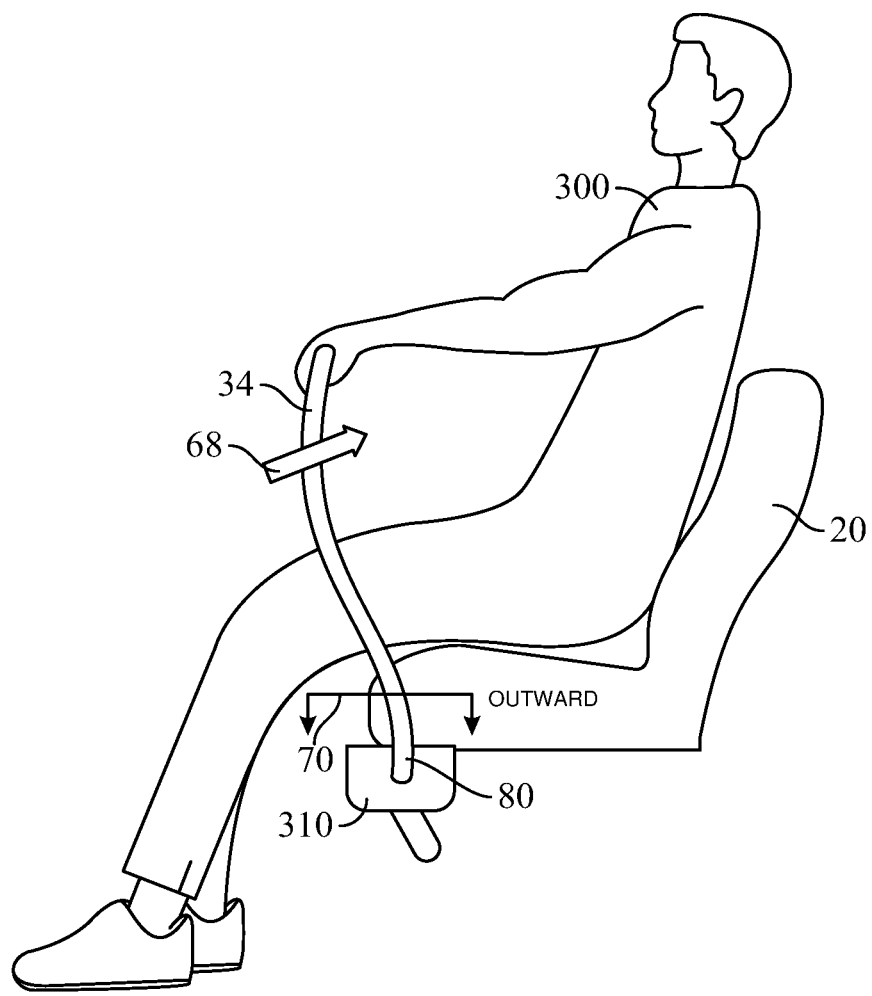
FIG. 5 illustrates a side view of an operator seated at a seat and moving a steering lever in accordance with an example embodiment.

As noted above, the outboard enabled, forward or rearward movement of the steering levers 34 may avoid situational ambiguity. However, selecting one of the enabled directions (e.g., the rearward direction) may be used in one example to further facilitate ease of operation due to the intuitive nature of pulling back (i.e., rearward) while standing to dismount the riding lawn care vehicle 10. Thus, a specific example embodiment will now be described in reference to FIGS. 5-7 in order to further illustrate an example embodiment. In this regard, FIG. 5 illustrates a side view of an operator 300 seated at the seat 20 and moving a left one of the steering levers 34 in the outward or outboard direction shown by arrow 70, and then subsequently pulling the steering lever 34 in the rearward direction shown by arrow 68. Although this motion could be demonstrated in the user manual and/or illustrated in an instructive manner on some portion of the riding lawn care vehicle 10, some example embodiments may further include a guide member 310 that may be employed to guide the lever mount 80 and/or restrict movement of the lever mount 80 and/or the steering lever 34 attached thereto.

Figure 6:
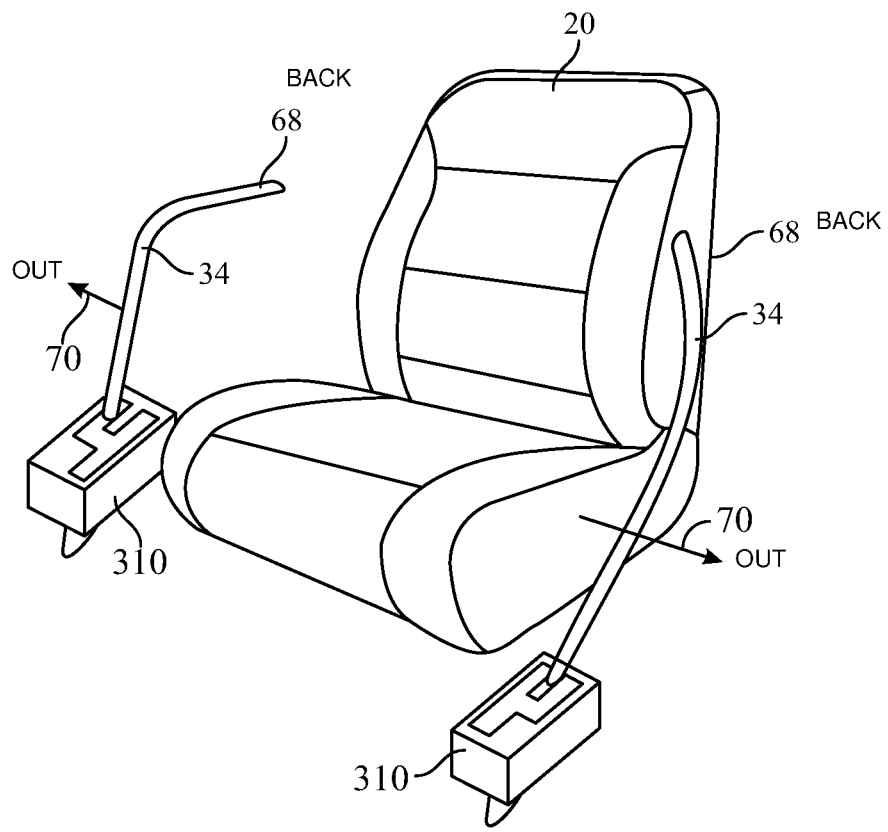
FIG. 6 is a perspective view of steering levers proximate to the seat and a guide member in accordance with an example embodiment.

FIG. 6 illustrates a perspective view showing the seat 20 and corresponding steering levers 34 on either side thereof. Furthermore, the lever mounts 80 of each of the steering levers 34 are provided in a respective instance of the guide member 310. FIG. 6 also demonstrates how the guide member 310 may be used to inform the operator 300 and also perhaps restrict motion of the lever mounts 80 or steering levers 34 relative to the guide member 310. In this regard, the guide member 310 may include a series of slots that may be configure to illustrate the allowable directions of movement of the lever mounts 80 or steering levers 34 and/or impacts of such movement.

Figure 7:
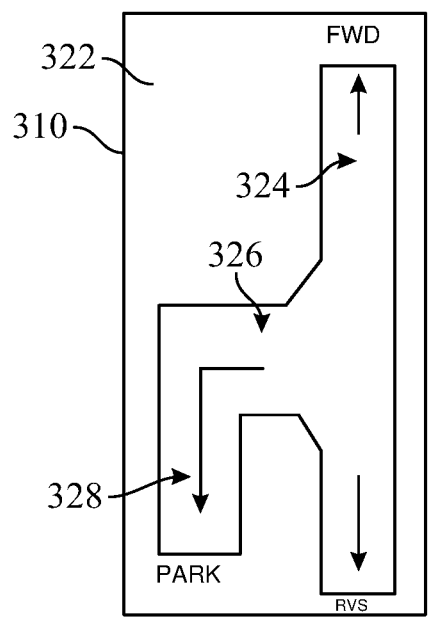
FIG. 7 illustrates a top view of the guide member of an example embodiment.

FIG. 7 is a top view of the guide member 310 to illustrate the structural arrangement of the slots, and the structure of the guide member 310. In this regard, the guide member 310 may be made of sheet metal, plastic or some other rigid component that includes a top plate 322 defining a first slot 324, a second slot 326 and a third slot 328 to restrict and/or illustrate movement options for the steering levers 34 or lever mounts 80. As shown in FIG. 7, the first slot 324 extends in a first direction, which typically also happens to correspond to forward and reverse (or rearward) directions of the riding lawn care vehicle 10. At or near the point at which a demarcation exists between forward and rearward directions along the first slot 324, the second slot 326 may extend away from the first slot 324 in a second direction that is substantially perpendicular to the first direction. The second direction may allow movement from the inboard position to the outboard position, as discussed above. At a distal end of the second slot 326, relative to the first slot 324, the third slot 328 may extend in a direction that is parallel to the first direction. In this case, the third slot 328 extends rearward. However, forward extension is also possible as an alternative. As noted above, movement of the steering levers 34 or lever mounts 80 fully rearward as much as permitted by the guide member 310 may engage the brake assembly 110.

Accordingly, some example embodiments may enable movement of a steering lever in a reverse (or forward) direction once in the outboard position in order to control the application of a parking brake or other brake assembly to the drive wheels of a mower such as a zero turn mower. Of note, it is far more common to have the steering levers operable in the inboard position and inoperable in the outboard position. However, it is entirely possible to reverse that paradigm as well. Thus, it should be appreciated that example embodiments may also be employed for an "inboard enabled" forward/rearward movement in a situation where the steering levers 34 are normally operated in an outboard position, and the parking brake can be applied after the steering levers 34 are moved inward. As such, example embodiments can be understood to apply to operating (e.g., normally inboard, but possibly outboard) position and non-operating (normally outboard, but possibly inboard) positions. In an example embodiment, a riding lawn care vehicle may therefore be provided. The vehicle may include a frame, a steering assembly, a brake assembly, and a mechanical brake linkage assembly. At least a first drive wheel and a second drive wheel of the riding lawn care vehicle may be attachable to the frame. The steering assembly may include first and second steering levers operably coupled to the first and second drive wheels respectively to facilitate turning of the riding lawn care vehicle based on drive speed control of the first and second drive wheels responsive to positioning of the first and second steering levers in an operating position. The brake assembly may be operably coupled to the first and second drive wheels to enable brakes to be selectively applied to the first and second drive wheels. The mechanical brake linkage assembly may be configured to activate the brake assembly relative to the first and second drive wheels in response to movement of the first and second steering levers in a direction parallel to the first direction after the first and second steering levers have been moved from the operating position to a non-operating position.

The riding lawn care vehicle (or mechanical brake linkage assembly) of some embodiments may include additional, optional features, and/or the features described above may be modified or augmented. Some examples of modifications, optional features and augmentations are described below. It should be appreciated that the modifications, optional features and augmentations listed below may each be added alone, or they may be added cumulatively in any desirable combination. For example, in some embodiments, the mechanical brake linkage assembly may be configured to enable the first steering lever to be pivoted to the outboard position by movement in a second direction that is substantially perpendicular to the first direction. In an example embodiment, the mechanical brake linkage assembly may be configured to engage a corresponding pawl and gear associated with each of the first and second drive wheels to lock a transaxle of each of the first and second drive wheels responsive to movement of a respective one of the first and second steering levers in the direction parallel to the first direction after movement in the second direction to the outboard position. In some cases, the first and second steering levers may be operably coupled to the first and second drive wheels via a first lever mount and a second lever mount, respectively. The first and second lever mounts may be pivotable between the inboard position and the outboard position by movement in the second direction, and may be pivotable forward and rearward by movement in the first direction. In an example embodiment, the first and second lever mounts may be pivotable rearward by movement in the direction parallel to the first direction while in the outboard position. In some cases, the mechanical brake linkage assembly may include a first motion converter and a second motion converter. The first motion converter may engage the second motion converter responsive to movement of the first lever mount to the outboard position, and the second motion converter may engage the brake assembly responsive to movement of the first lever mount in the direction parallel to the first direction. In an example embodiment, the vehicle may further include a guide member that includes a first slot extending in the first direction, a second slot extending away from the first slot in the second direction, and a third slot extending from a distal end of the second slot relative to the first slot in the direction parallel to the first direction. In some cases, the first lever mount may be configured to move in a forward and rearward direction within the first slot, and from the inboard position to the outboard position in the second slot. In an example embodiment, the first lever mount may be configured to move from the distal end of the second slot rearward within a third slot to activate the brake assembly. In some cases, the riding lawn care vehicle may be a zero turn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
a frame to which at least a first drive wheel and a second drive wheel of the riding lawn care vehicle are attachable;
a steering assembly comprising a first steering lever and a second steering lever, wherein the first and second steering levers are operably coupled to the first and second drive wheels respectively to facilitate turning of the riding lawn care vehicle based on drive speed control of the first and second drive wheels responsive to positioning of the first and second steering levers along a first direction when the first and second steering levers are in an operating position;
a brake assembly operably coupled to the first and second drive wheels to enable brakes to be selectively applied to the first and second drive wheels; and
a mechanical brake linkage assembly configured to activate the brake assembly relative to the first and second drive wheels in response to movement of the first and second steering levers in a direction parallel to the first direction after the first and second steering levers have been moved from the operating position to a non-operating position.

2. The riding lawn care vehicle of claim 1, wherein the operating position is an inboard position and the non-operating position is an outboard position.

3. The riding lawn care vehicle of claim 2, wherein the mechanical brake linkage assembly is configured to enable the first steering lever to be pivoted to the outboard position by movement in a second direction that is substantially perpendicular to the first direction.

4. The riding lawn care vehicle of claim 3, wherein the mechanical brake linkage assembly is configured to engage a corresponding pawl and gear associated with each of the first and second drive wheels to lock a transaxle of each of the first and second drive wheels responsive to movement of a respective one of the first and second steering levers in the direction parallel to the first direction after movement in the second direction to the outboard position.

5. The riding lawn care vehicle of claim 2, wherein the first and second steering levers are operably coupled to the first and second drive wheels via a first lever mount and a second lever mount, respectively, the first and second lever mounts being pivotable between the inboard position and the outboard position by movement in the second direction, and being pivotable forward and rearward by movement in the first direction.

6. The riding lawn care vehicle of claim 5, wherein the first and second lever mounts are pivotable rearward by movement in the direction parallel to the first direction while in the outboard position.

7. The riding lawn care vehicle of claim 2, further comprising a guide member, wherein the guide member comprises a first slot extending in the first direction, a second slot extending away from the first slot in the second direction, and a third slot extending from a distal end of the second slot relative to the first slot in the direction parallel to the first direction.

8. The riding lawn care vehicle of claim 7, wherein the first lever mount is configured to move in a forward and rearward direction within the first slot, and from the inboard position to the outboard position in the second slot.

9. The riding lawn care vehicle of claim 8, wherein the first lever mount is configured to move from the distal end of the second slot rearward within a third slot to activate the brake assembly.

10. The riding lawn care vehicle of claim 1, wherein the mechanical brake linkage assembly comprises a first motion converter and a second motion converter, wherein the first motion converter engages the second motion converter responsive to movement of the first lever mount to the outboard position, and wherein the second motion converter engages the brake assembly responsive to movement of the first lever mount in the direction parallel to the first direction.

11. The riding lawn care vehicle of claim 1, wherein the riding lawn care vehicle is a zero turn mower.

12. A mechanical brake linkage assembly of a riding lawn care vehicle, wherein the riding lawn care vehicle comprises first and second drive wheels, first and second steering levers, and a brake assembly, wherein the brake assembly is operably coupled to the first and second drive wheels to enable brakes to be selectively applied to the first and second drive wheels, wherein the first steering lever is operably coupled to the first drive wheel and the second steering lever is operably coupled to the second drive wheel, and wherein the riding lawn care vehicle is steerable via the first and second steering levers to facilitate turning of the riding lawn care vehicle based on drive speed control of the first and second drive wheels responsive to positioning of the first and second steering levers along a first direction while the first and second steering levers are in an operating position,
wherein the mechanical brake linkage assembly is configured to activate the brake assembly relative to the first and second drive wheels in response to movement of the first and second steering levers in a direction parallel to the first direction after the first and second steering levers have been moved from the operating position to a non-operating position.

13. The mechanical brake linkage assembly of claim 12, wherein the operating position is an inboard position and the non-operating position is an outboard position.

14. The mechanical brake linkage assembly of claim 13, wherein the mechanical brake linkage assembly is configured to enable the first steering lever to be pivoted to the outboard position by movement in a second direction that is substantially perpendicular to the first direction.

15. The mechanical brake linkage assembly of claim 14, wherein the mechanical brake linkage assembly is configured to engage a corresponding pawl and gear associated with each of the first and second drive wheels to lock a transaxle of each of the first and second drive wheels responsive to movement of a respective one of the first and second steering levers in the direction parallel to the first direction after movement in the second direction to the outboard position.

16. The mechanical brake linkage assembly of claim 13, wherein the first and second steering levers are operably coupled to the first and second drive wheels via a first lever mount and a second lever mount, respectively, the first and second lever mounts being pivotable between the inboard position and the outboard position by movement in the second direction, and being pivotable forward and rearward by movement in the first direction.

17. The mechanical brake linkage assembly of claim 16, wherein the first and second lever mounts are pivotable rearward by movement in the direction parallel to the first direction while in the outboard position.

18. The mechanical brake linkage assembly of claim 13, wherein the mechanical brake linkage assembly comprises a first motion converter and a second motion converter, wherein the first motion converter engages the second motion converter responsive to the first lever mount being pivoted to the outboard position, and wherein the second motion converter engages the brake assembly responsive to movement of the first lever mount in the direction parallel to the first direction.

19. A guide member for a riding lawn care vehicle, wherein the riding lawn care vehicle comprises first and second drive wheels, first and second steering levers, a mechanical brake linkage assembly and a brake assembly, wherein the brake assembly is operably coupled to the first and second drive wheels to enable brakes to be selectively applied to the first and second drive wheels, wherein the first steering lever is operably coupled to the first drive wheel and the second steering lever is operably coupled to the second drive wheel, and wherein the riding lawn care vehicle is steerable via the first and second steering levers to facilitate turning of the riding lawn care vehicle based on drive speed control of the first and second drive wheels responsive to positioning of the first and second steering levers along a first direction while the first and second steering levers are in an operating position, wherein the mechanical brake linkage assembly is configured to activate the brake assembly relative to the first and second drive wheels in response to movement of the first and second steering levers in a direction parallel to the first direction after the first and second steering levers have been moved from the operating position to a non-operating position, and wherein the guide member comprises a top plate defining a first slot, a second slot and a third slot to restrict movement of the first and second steering levers.

20. The guide member of claim 19, wherein the operating position is an inboard position and the non-operating position is an outboard position.

21. The guide member of claim 20, wherein the first slot extends in the first direction, the second slot extends away from the first slot in a second direction substantially perpendicular to the first direction, and the third slot extends from a distal end of the second slot relative to the first slot in the direction parallel to the first direction.

22. The guide member of claim 21, wherein the first slot enables the first lever to move in a forward and rearward direction within the first slot when the first lever is in the inboard position, and wherein the second slot extends from a midpoint of the first slot to enable the first lever to move from the inboard position to the outboard position in the second slot.

23. The guide member of claim 22, wherein the first lever is configured to move from the distal end of the second slot rearward within the third slot to activate the brake assembly.

* * * * *